(12) United States Patent
Horng et al.

(10) Patent No.: US 7,376,090 B2
(45) Date of Patent: May 20, 2008

(54) METHOD OF DETECTING DISTRIBUTED DENIAL OF SERVICE BASED ON GREY THEORY

(75) Inventors: Gwoboa Horng, BenTang Village (TW); Chan-Lon Wang, KouHu Township, Yunlin County (TW); Chern-Tang Lin, LiuJia Township, Tainan County (TW)

(73) Assignee: Institute For Information Industry, Taipei (TW)

( * ) Notice: Subject to any disclaimer, the term of this patent is extended or adjusted under 35 U.S.C. 154(b) by 741 days.

(21) Appl. No.: 10/865,569

(22) Filed: Jun. 10, 2004

(65) Prior Publication Data
US 2005/0135266 A1    Jun. 23, 2005

(30) Foreign Application Priority Data
Dec. 22, 2003    (TW) .............................. 92136355 A

(51) Int. Cl.
*H04L 12/28* (2006.01)

(52) U.S. Cl. .................. 370/255; 370/252; 700/48; 701/59; 726/23

(58) Field of Classification Search .................. 726/23; 715/550; 370/252, 235, 255; 700/48; 701/59
See application file for complete search history.

(56) References Cited

U.S. PATENT DOCUMENTS 7,234,168 B2 *    6/2007    Gupta et al. .................. 726/25

| | | | |
|---|---|---|---|
| 2003/0065926 A1 * | 4/2003 | Schultz et al. | 713/188 |
| 2004/0205474 A1 * | 10/2004 | Eskin et al. | 715/500 |
| 2005/0086538 A1 * | 4/2005 | Kubota | 713/201 |
| 2005/0111367 A1 * | 5/2005 | Chao et al. | 370/235 |

OTHER PUBLICATIONS

Chen et al.; "A novel modified grey model"; Aug. 2003;SICE Annual Conference in Fukui; pp. 890-895.*

Xiao et al.; "A New Modeling Technique of GM(1,1) Prediction Model"; Nov. 2003; IEEE; pp. 990-992.*

Chen et al. ; "Traffic Flow Forecasting Based On Grey Neural Network Model";2003; IEEE; pp. 1275-1278.*

Chen et al.; "A novel modified grey model"; 2003; IEEE; pp. 890-895.*

Hsu et al./"Greyt-Neural Forecasting System"; 1999;Fifth International Symposium on Signal Processing and its Applications; pp. 139-142.*

* cited by examiner

*Primary Examiner*—Ricky Q. Ngo
*Assistant Examiner*—Samuel DeWanda
(74) *Attorney, Agent, or Firm*—Thomas, Kayden, Horstemeyer & Risley

(57) ABSTRACT

A method of malicious network activity detection. An intrusion detection system provides defense against distributed denial of service (DDOS) attacks through an efficient modeling process based on grey theory.

16 Claims, 5 Drawing Sheets

METHOD OF DETECTING DISTRIBUTED DENIAL OF SERVICE BASED ON GREY THEORY

BACKGROUND OF THE INVENTION

1. Field of the Invention

The present invention relates to a method for detecting distributed denial of service (DDOS) attacks, and in particular, to an analyzing method based on grey theory for detecting DDOS attacks.

2. Description of the Related Art

Currently, malicious network activities are detected through comparison of ongoing traffic data to previously obtained traffic data within certain periods of time, such as network flow in one week. For example, to determine an occurrence of network intrusion at mid-night on a Wednesday, traffic data from the previous Wednesday is compared, and if any malicious network activity is determined, a defense procedure is activated. Considerable data storage is consumed in achieving the determination, and computation resources are taxed when searching and comparing stored traffic data. Currently, to overcome bottlenecks in data calculation speed, costly hardware is utilized along with various data mining technologies and applications.

In data mining, messages hidden in various data are analyzed and categorized. Various methodologies, each having different advantages and applicability are utilized in data mining. Methods are divided into those based on traditional statistical theories, such as identifying valuable messages in data or distribution of different data types, and those having close relationships with traditional artificial intelligence domains, such as grouping, categorizing, and similarity searching. Many of the methods therein are highly developed with significant results. In addition to traditional quality determination of standard data testing, data mining has currently been utilized with database technologies.

Intrusion detection systems are therefore applied with theories of data mining to quantify, categorize, group, and label network traffic data in various mathematical methodologies. First, network traffic data is converted to sequences. Thereafter, corresponding characteristic patterns are built through algorithms such as sequential pattern mining, and then compared with previously built characteristic patterns stored in an existing knowledge database to determine whether a similarity threshold is exceeded. The characteristic patterns are assessed as identical when the similarity threshold is exceeded, and if the new characteristic patterns are supersets of the old ones, the knowledge database is updated accordingly. If the characteristic patterns do not previously exist in the knowledge database, they are analyzed by an assessment module, and the result is fed back to the knowledge database as new rules for further intrusion detection and system management.

Intrusion detection is currently accomplished through statistics and data mining, and relies on hardware to overcome computation speed bottlenecks. While characteristic patterns are sought, network traffic data is extended infinitely, whereby loading may be too high for the system to complete the detection, and storage capacity may be insufficient to store network traffic data. Current high volumes of traffic and rapid migration of malicious activity characteristics combine to easily thwart conventional statistical and data mining technology. When DDOS attacks occur, not only do system administrators suffer, but entire enterprises may be seriously affected.

SUMMARY OF THE INVENTION

The present invention relates to detection of distributed denial of service (DDOS) attacks. According to the invention, grey theory is applied in the detection method. Grey theory was first disclosed in 1982 by Dr. Chu-Lung Dang. It enables analysis of parameters and model construction in a system model with a degree of uncertainty and inadequate supporting information. Related information is available in "The Journal of Grey System, ISSN: 0957-3720.

In general, analysis of network flow is based on a statistical model which finds corresponding statistical properties among data in a sample set too large to process and maintain. Grey theory can thus be applied in traffic data analysis, whereby only selected known traffic data is utilized to establish a prediction model, such that corresponding analysis can be accomplished.

An efficient and accurate intrusion detection system is provided to achieve the object, in which a method of malicious network activity detection comprises the following steps. First, network flow is received to generate a first sequence $S_1$ and a second sequence $S_2$, each of which comprises a plurality of consecutive traffic data elements, with at least one traffic data element in $S_2$ a succession of $S_1$. Thereafter, based on grey theory, a first model comprising development coefficient $a_1$ and random factor $b_1$ according to $S_1$ is created, and $T_2$, a predictive sequence corresponding to $S_1$, comprising a plurality of predictive traffic data elements $Y_K$, is generated by substituting $S_1$ and the first model into the equation A.1:

$$y_{k+1} = \left(x_0 - \frac{b}{a}\right) \cdot e^{-ak} + \frac{b}{a}$$

In the equation A.1, $X_0$ represents the first traffic data element of the sequence. Finally, network activity is analyzed by comparing $T_2$ and $S_2$, and a defense procedure is initialed when the analysis result meets a predetermined condition.

Another object of the present invention is to provide a network device enabling defense against malicious network activities. The network device comprises a network flow collector, a grey analyzer and a security trigger. The network flow collector generates sequences S by receiving network flow and the grey analyzer generates predictive sequences T through equation A.1 and assesses an intrusion by comparing S and T. The security trigger initials defense procedures when the comparison result meets a predetermined condition.

A further object of the present invention is to provide a rule database for recording models corresponding to each sequence. The rule database comprises information of size, shift distance, and tolerable thresholds of traffic data corresponding to each sequence.

BRIEF DESCRIPTION OF THE DRAWINGS

The following detailed description, given by way of example and not intended to limit the invention solely to the embodiments described herein, will best be understood in conjunction with the accompanying drawings, in which.

DETAILED DESCRIPTION OF THE INVENTION

Figure 5:
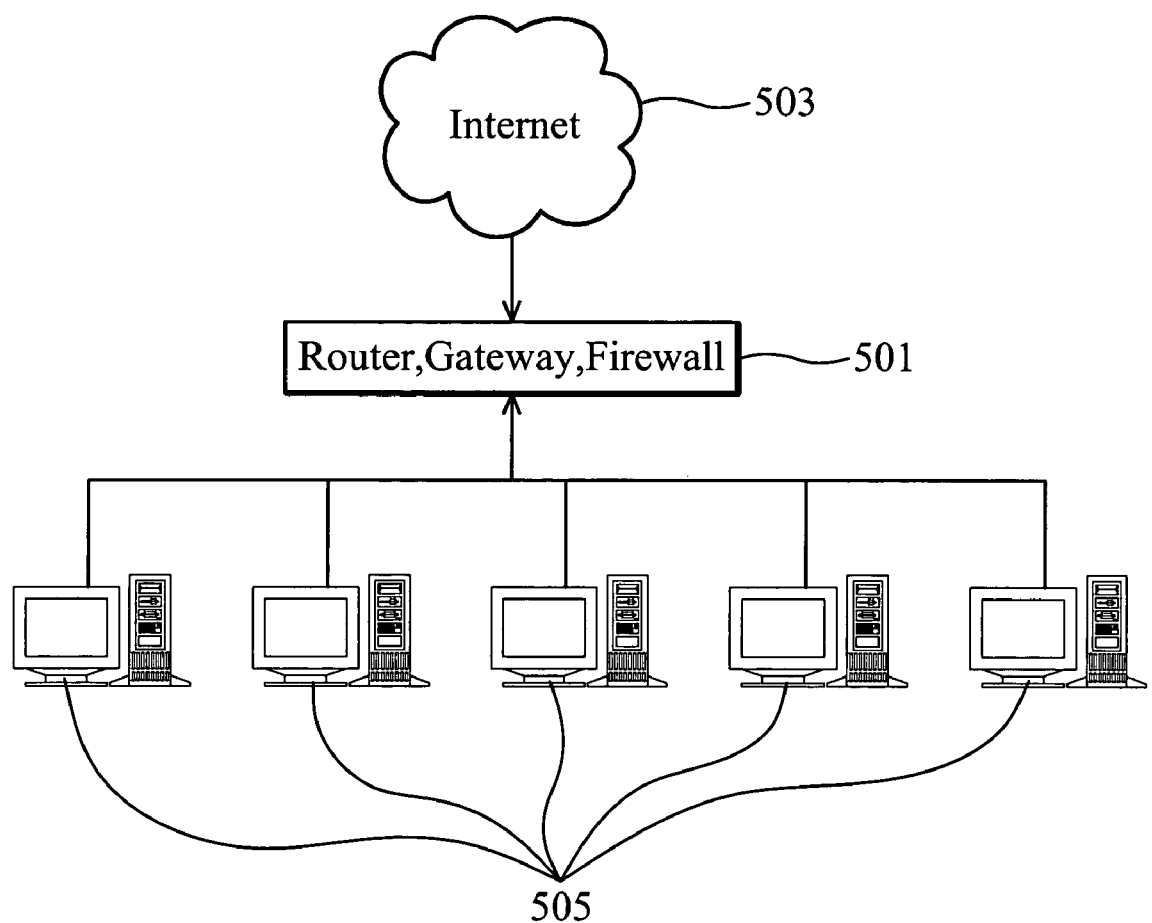
FIG. 5 shows the network architecture according to the present invention.

FIG. 5 shows the network architecture according to the present invention. An apparatus 501 functioning as a router is connected to the Internet 503.

Figure 1:
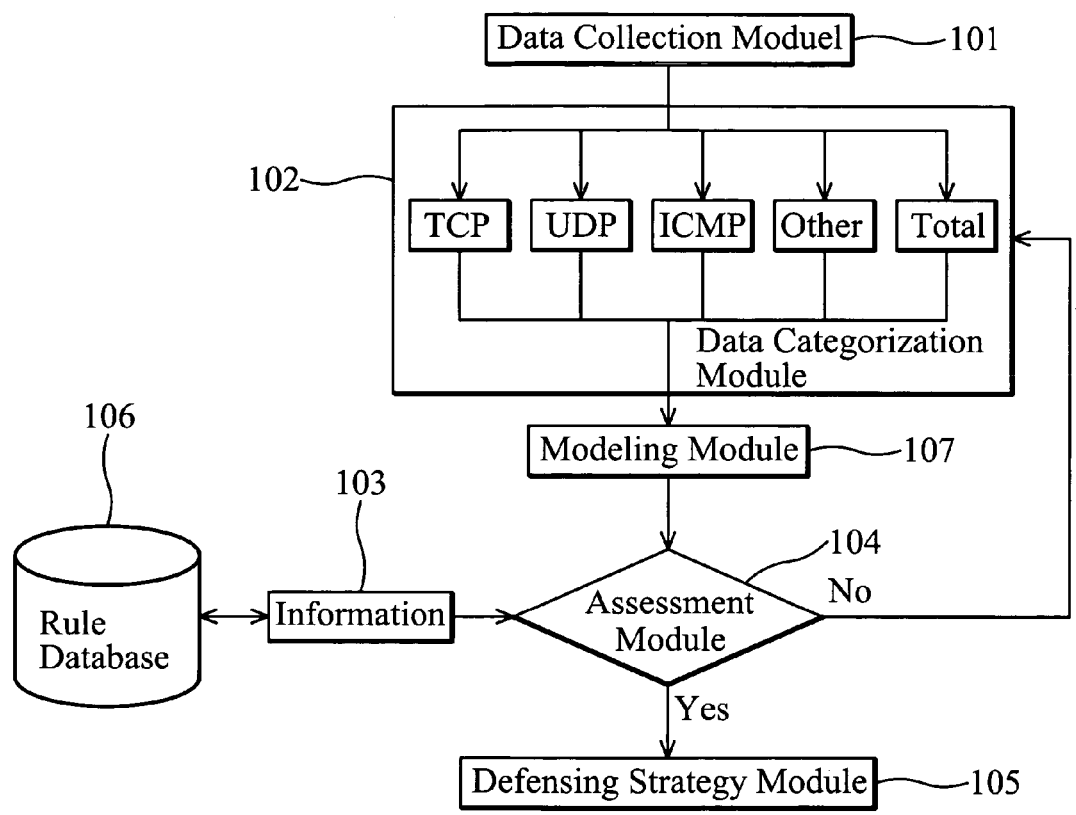
FIG. 1 is a flowchart of data processing according to the present invention.

As shown in FIG. 1, the system of the present invention comprises collection module 101, categorization module 102, modeling module 107, assessment module 104, and defense strategy module 105.

The collection module 101 collects traffic data by receiving network flow through the router. The categorization module 102 categorizes the traffic data by protocol, such as TCP, UDP, and ICMP and so on. Additionally, total traffic data is categorized as one class. In the data categorization module 102, false diagnosis of legal access is avoided by categorizing traffic data, thus increasing accuracy of intrusion detection. The categorized traffic data is then processed separately in the modeling module 107.

In the modeling module 107, network flow, comprising a plurality of traffic data, is taken as sequence of numbers. By means of the modeling process based on grey theory, a model corresponding to the sequence of numbers, comprising development coefficient a and random factor b, is generated. The development coefficient a represents developing rate of sequence, in direct proportion. The random factor b represents irregularity of sequence, the higher the more irregular. When network flow is modeled, network activity can be described mathematically. Based on grey theory, the model described by development coefficient a and random factor b, is also known as GM (1, 1) in the art.

A rule database 106 is provided, for recording models created and corresponding information 103, including events of malicious network activities, and predetermined tolerable thresholds of network flow corresponding to hardware and service conditions, such that bandwidth management is enabled. By means of the rule database 106, when hardware is upgraded or configuration is reset, the assessment module 104 is automatically tuned without false diagnosis.

In the assessment module 104, network activities are assessed to determine whether an intrusion alert should be delivered, by analyzing the model generated from the traffic data collected and referring to the rules in the rule database 106. Network flow at different times generates different models representing different network activities, and upper limits of bandwidth thresholds differ. An intrusion is assessed as positive when network activity is deemed suspicious by the assessment module 104, and the bandwidth occupied exceeds the bandwidth threshold defined in the rule database 106.

In another case, if the intrusion detection system of the present invention is implemented in distributed network architecture, a network of nodes established with a plurality of intrusion detection systems, then nodes therein can alert each other when intrusions occur, providing mutual security, such that entire network is protected.

In the defense strategy module 105, defense procedures are implemented flexibly. For example, when DDOS attacks occur, IP trace-back mechanism is activated, and intrusion information 103, such as coefficients and factors of models, or bandwidth thresholds, are shared with other nodes, such that the attack is avoided cooperatively.

In conclusion, the intrusion detection system processes traffic data via data collection module 101, data categorization module 102, modeling module 107, assessment module 104, and defense strategy module 105. To achieve efficient and accurate intrusion detection, the present invention provides a volatile time series algorithm based on grey theory for creating GM (1, 1) models. Detailed steps are described below.

Figure 2A:
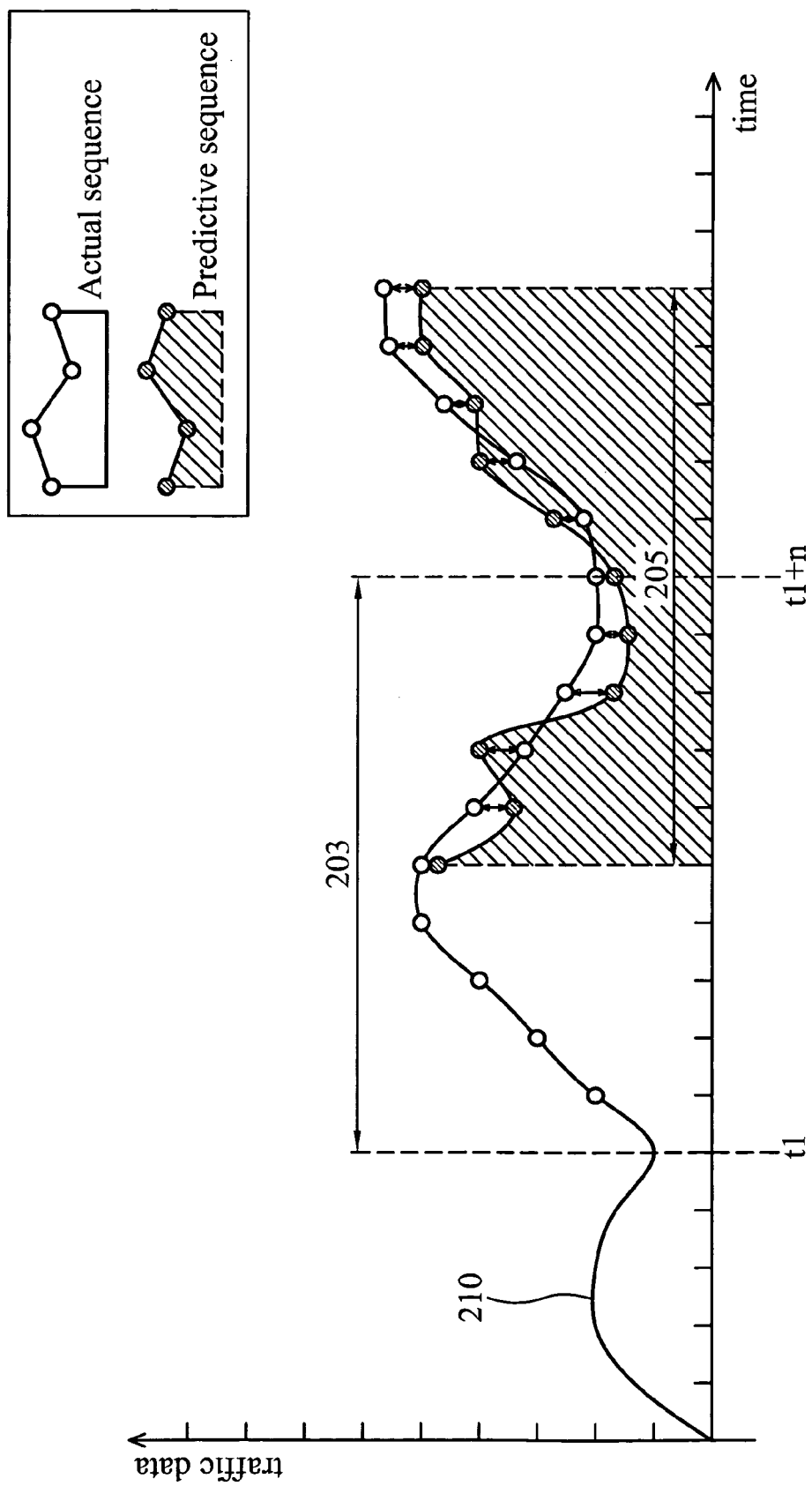
FIG. 2a shows the first modeling process according to the present invention.
Figure 2B:
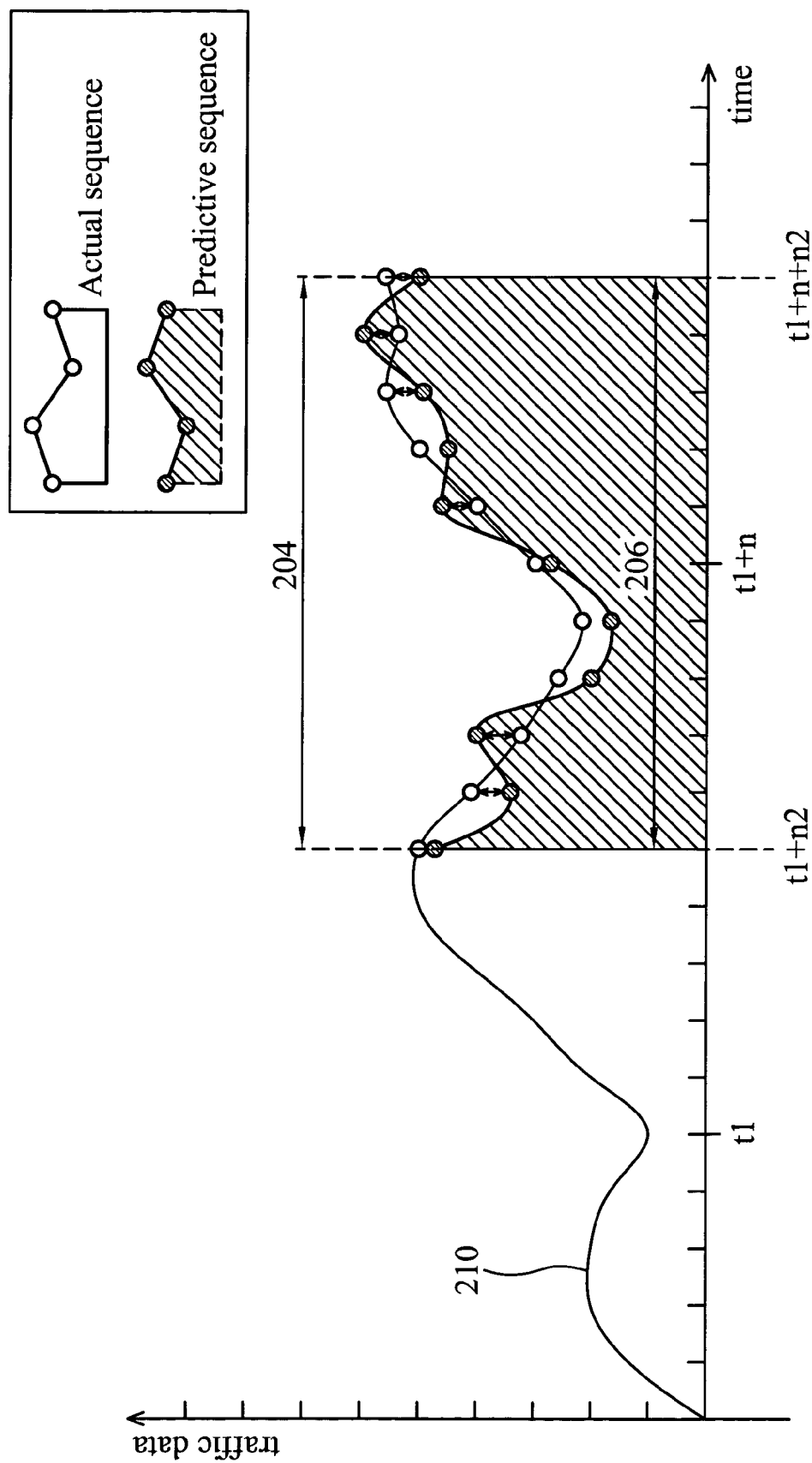
FIG. 2b shows the second modeling process according to the present invention.

FIG. 2a and FIG. 2b show the first and the second modeling processes according to the present invention. Network flow 210, comprising a plurality of traffic data elements, grows with time. In FIG. 2a, the first sequence 203 comprises n traffic data elements x (from t1 to t1+n), each of which is denoted as $x_1(k)$, k=1, 2, n in further description. In FIG. 2b, the second sequence 204 overlapping the first sequence 203 (from t1+n2 to t1+n+n2), comprises n traffic data elements, similarly, each is denoted as $x_2(k)$, k=1, 2, n in further description. Elements of traffic data x may be bits per second (bps), or kilobytes per second (KBps), depending on usage of the system.

Based on grey theory, a sequence can be characterized by two coefficients, development coefficient a and random factor b, obtained through the modeling process. First, accumulating sequences $x^{(1)}_1$ corresponding to the first sequence 203 are obtained with equation A.2:

$$x_1^{(1)}(k) = \sum_{j=1}^{k} x_1(j), k = 1, 2, \ldots, n$$

A mean value sequence $z^{(1)}_1$ corresponding to the first sequence 203 is obtained with equation A.3:

$$Z_1^{(1)}(k) = \frac{x_1^{(1)}(k) + x_1^{(1)}(k+1)}{2}, k = 1, 2, \ldots, n-1$$

Accordingly, intermediate coefficients $C_1$, $D_1$, $E_1$, and F1 corresponding to the first sequence are obtained with equations A.4, A.5, A.6, and A.7:

$$C_1 = \sum_{k=2}^{n} z_1^{(1)}(k) \tag{A.4}$$

$$D_1 = \sum_{k=2}^{n} x_1(k) \tag{A.5}$$

$$E_1 = \sum_{k=2}^{n} z_1^{(1)}(k) \cdot x_1(k) \tag{A.6}$$

$$F_1 = \sum_{k=2}^{n} z_1^{(1)}(k)^2 \tag{A.7}$$

A first model is created by obtaining development coefficient $a_1$ and random factor $b_1$ corresponding to each sequence with equations A.8 and A.9:

$$a_1 = \frac{C_1 D_1 - (n-1)E_1}{(n-1)F_1 - C_1^2} \quad (A.8)$$

$$b_1 = \frac{D_1 F_1 - C_1 E_1}{(n-1)F_1 - C_1^2} \quad (A.9)$$

The first predictive sequence 205, corresponding to the second sequence 204, comprising a plurality of predictive traffic data elements $y_2(k)$, is obtained by substituting $a_1$, $b_1$ and the first value of the first sequence 203 into equations A.10 and A.11:

$$y_2^{(1)}(k+1) = \left(x_1(1) - \frac{b_1}{a_1}\right) \cdot e^{-a_1(k+n2)} + \frac{b_1}{a_1} \quad (A.10)$$

$$y_2(k) = y_2^{(1)}(k) - y_2^{(1)}(k-1), \ k=1, 2, \ldots, n \quad (A.11)$$

The shift distance, n2, as shown in FIG. 2b, represents latency between the first sequence 203 and the second sequence 204.

Thus, between the first predictive sequence 205 and the second sequence 204, inaccuracy $e_2$ can be obtained via equation E.1:

$$e_2(k) = \sum_{k=1}^{n} \left(\frac{y_2(k) - x_2(k)}{x_2(k)}\right)^2 \quad (E.1)$$

Similarly, a second model corresponding to the second sequence 204 can be obtained using equations B.2 to B.9, obtaining the second model comprising $a_2$ and $b_2$:

$$x_2^{(1)}(k) = \sum_{j=1}^{k} x_2(j), \ k = 1, 2, \ldots, n \quad (B.2)$$

$$Z_2^{(1)}(k) = \frac{x_2^{(1)}(k) + x_2^{(1)}(k+1)}{2}, \ k=1, 2, \ldots, n-1 \quad (B.3)$$

$$C_2 = \sum_{k=2}^{n} z_2^{(1)}(k) \quad (B.4)$$

$$D_2 = \sum_{k=2}^{n} x_2(k) \quad (B.5)$$

$$E_2 = \sum_{k=2}^{n} z_2^{(1)}(k) \cdot x_2(k) \quad (B.6)$$

$$F_2 = \sum_{k=2}^{n} z_2^{(1)}(k)^2 \quad (B.7)$$

$$a_2 = \frac{C_2 D_2 - (n-1)E_2}{(n-1)F_2 - C_2^2} \quad (B.8)$$

$$b_2 = \frac{D_2 F_2 - C_2 E_2}{(n-1)F_2 - C_2^2} \quad (B.9)$$

The second predictive sequence 206, corresponding to the second sequence 204, comprising a plurality of predictive traffic data elements $w_2(k)$, is obtained by substituting $a_2$, $b_2$ and the first value of the second sequence 204, $x_2(1)$, into equations B.10 and B.11:

$$w_2^{(1)}(k+1) = \left(x_2(1) - \frac{b_2}{a_2}\right) \cdot e^{-a_2(k)} + \frac{b_2}{a_2} \quad (B.10)$$

$$w_2(k) = w_2^{(1)}(k) - w_2^{(1)}(k-1), \ k=1, 2, \ldots, n \quad (B.11)$$

Similarly, inaccuracy $e'_2$ between the second predictive sequence 206 and the second sequence 204 can be obtained with equation E.2:

$$e'_2(k) = \sum_{k=1}^{n} \left(\frac{w_2(k) - x_2(k)}{x_2(k)}\right)^2 \quad (E.2)$$

In conclusion, in FIG. 2a, the first predictive sequence 205 is obtained with the first model generated from the first sequence 203, and in FIG. 2b, the second predictive sequence 206 is obtained with the second model generated form the second sequence 204. A difference $d_2$ between $e_2$ and $e'_2$ is therefore obtained:

$$d_2 = e'_2 - e_2 \quad (E.3)$$

and variation $\sigma_2$ is obtained from equation E.4.

$$\sigma_2 = \sqrt{e_2} \quad (E.4)$$

Thus assessment can be accomplished by determining Whether $d_2$ or $\sigma_2$ meet a certain condition. In some cases, size of each sequence is not necessarily n, and can be dynamically adjustable based on a certain rule. For example, network flow collected during operation-hours comprises more traffic data and greater variation in network activity than that collected during off-hours, such that the modeling process is flexible by choosing a proper sample rate, that is to say, a proper value of sequence size n and shifting distance n2, which information 103 is stored in rule database 106.

The present invention provides an efficient modeling process for network activity analysis based on grey theory, and fewer than twenty traffic data elements are required to detect variations in network activity.

Figure 3:
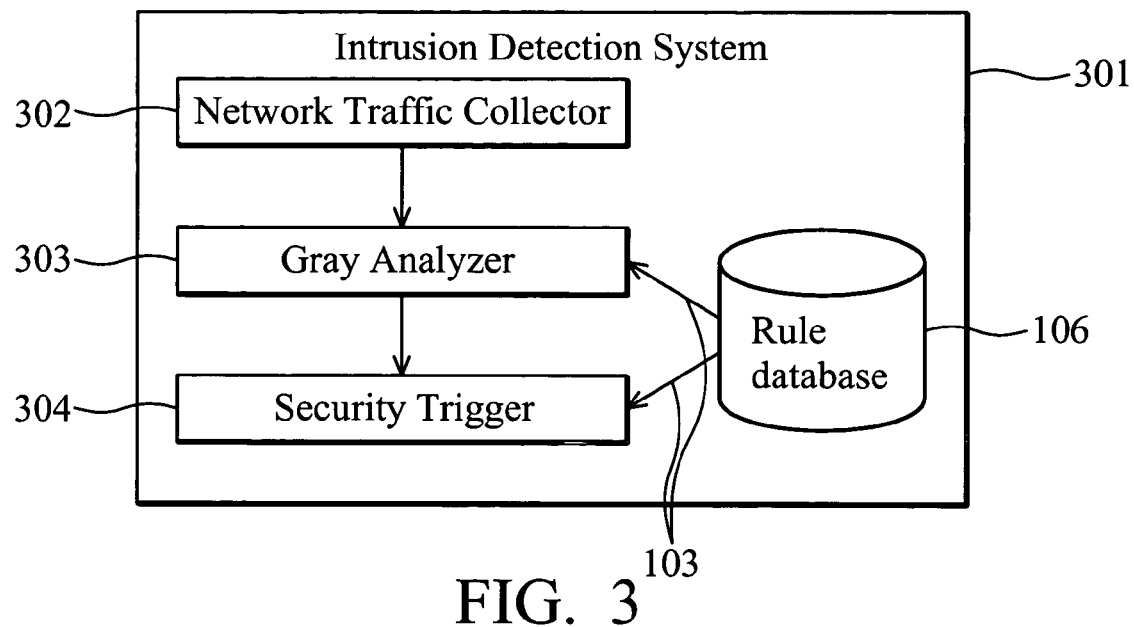
FIG. 3 is a block diagram of the intrusion detection system according to the present invention.

In another case, as shown in FIG. 3, an intrusion detection system 301 is provided. The intrusion detection system 301 comprises network flow collector 302, grey analyzer 303, security trigger 304 and rule database 106.

The network flow collector 302 collects traffic data, and categorizes the collected traffic data by protocol, such as TCP, UDP, and ICMP. The grey analyzer 303, in cooperation with the rule database 106, creates models of traffic data based on grey theory, and determines whether an intrusion has taken place. The security trigger 304 implements a defense procedure when an intrusion is assessed as positive. The defense procedure comprises steps of sending an alert to at least one network node, and limiting bandwidth of the attacked service, avoiding denial of legal services. Additionally, when an intrusion detection system receives at least one alert sent from other system, the defense procedure activates.

Figure 4:
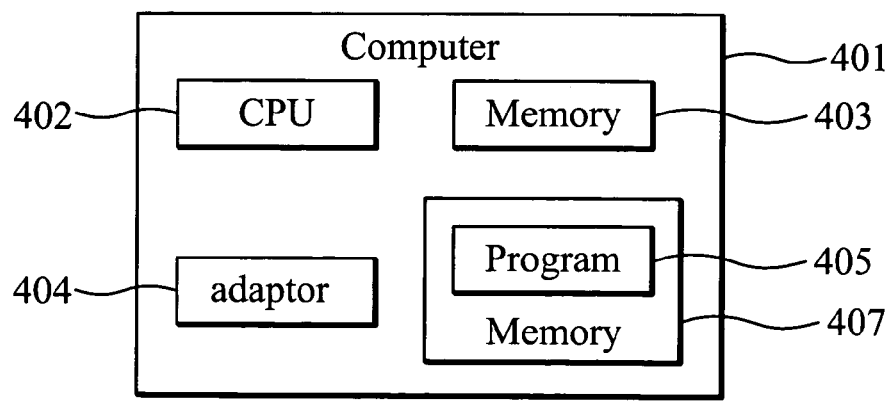
FIG. 4 is a block diagram of the computer and program according to the present invention.

Another embodiment is shown in FIG. 4. A computer system 401 comprises a central processing unit 402, memory 403, a network adaptor 404 and storage media 407. A program 405 for intrusion detection is stored in the storage media 407. When the program 405 is loaded to memory 403, the central processing unit 402 can process intrusion detection and defense procedures. The program is algorithm-based on grey theory, such that the process is efficient and accurate, overcoming bottlenecks from which conventional intrusion detection systems suffer.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of network activity detection, comprising the following steps:
   receiving network flow to generate a first sequence and a second sequence, each equivalently comprising a plurality of consecutive traffic data elements, with at least one traffic data element in the second sequence a succession of the first sequence;
   creating a first model according to the first sequence, comprising a first development coefficient and a first random factor;
   generating a first predictive sequence corresponding to the second sequence by substituting the first sequence and the first model into the equation $$y_{k+1} = \left(x_0 - \frac{b}{a}\right) \cdot e^{-ak} + \frac{b}{a},$$

$X_0$ represents the first traffic data element in the first sequence; and
   $y_k$ represents traffic data in predictive sequence;
   k is a natural number indexing traffic data in predictive sequence;
   analyzing malicious network activities by comparing the first predictive sequence and the second sequence; and
   implementing a defense procedure when an analyzing result meets a predetermined condition.

2. The method as claimed in claim 1, wherein the network flow is received through a network node, and the receiving step further comprises categorizing the network flow into classes.

3. The method as claimed in claim 1, wherein:
   the first sequence comprises traffic data elements $X_1$ to $X_N$;
   the second sequence comprises traffic data elements $X_{M+1}$ to $X_{M+N}$; and
   M is a natural number between 1 and N.

4. The method as claimed in claim 3, further comprising, after creation of the first model, creating a second model according to the second sequence, comprising a second development coefficient and a second random factor.

5. The method as claimed in claim 4, further comprising, after creation of the second model, generating a second predictive sequence corresponding to the second sequence by substituting the second sequence and the second model into the equation.

6. The method as claimed in claim 5, wherein the analyzing step comprises:
   calculating a first inaccuracy between the second sequence and the first predictive sequence;
   calculating a second inaccuracy between the second sequence and the second predictive sequence; and
   comparing the first and second inaccuracies.

7. The method as claimed in claim 1, wherein the defense procedure comprises:
   sending an alert to at least one network node; and
   restricting bandwidth serving the attacked network flow.

8. The method as claimed in claim 1, in which the defense procedure is also implemented upon receipt of an alert from at least one network node.

9. The method as claimed in claim 1, in which the defense procedure is also implemented when the traffic data element exceeds a predetermined tolerable threshold.

10. The method as claimed in claim 9, wherein a rule database is provided for recording the models corresponding to each sequence, comprising:
    value of N and M; and
    value of the predetermined tolerable threshold.

11. A network device providing network activity detection, comprising:
    a network flow collector for generating a first sequence and a second sequence by receiving network flow comprising a plurality of traffic data element, wherein the first sequence comprises traffic data element $X_1$ to $X_N$, and the second sequence comprises traffic data elements $X_{M+1}$ to $X_{M+N}$ where M is a value between 1 and N;
    a grey analyzer for creating a first model comprising a first development coefficient and a first random factor according to the first sequence, generating a first predictive corresponding to the first sequence by substituting the first model and the first sequence into a formula of $$y_{k+1} = \left(x_0 - \frac{b}{a}\right) \cdot e^{-ak} + \frac{b}{a},$$

and assessing an intrusion by analyzing the first sequence and the first predictive sequence, wherein:
        $X_0$ represents the first traffic data element in the substituted sequence;
        y represents traffic data element of the predictive sequence; and
        k is a natural number indexing traffic data element in sequence; and
    a security trigger for implementing a defense procedure when an analysis result meets a predetermined condition.

12. The device as claimed in claim 11, wherein the grey analyzer further creates a second model according to the second sequence, comprising a second development coefficient and a second random factor.

13. The device as claimed in claim 12, wherein the grey analyzer further generates a second predictive sequence by substituting the second sequence and the second model into the equation.

14. The device as claimed in claim 13, wherein the grey analyzer further calculates a first inaccuracy between the second sequence and the first predictive sequence, a second inaccuracy between the second sequence and the second predictive sequence, and obtaining a result by comparing the first and second inaccuracies.

15. The device as claimed in claim 14, wherein the security trigger implements a defense procedure upon receipt of the alert from at least one network node or when the traffic data element exceeds a predetermined tolerable threshold, wherein the defense procedure comprises the steps of:

sending an alert to at least one network node; and
restricting bandwidth serving the network flow.

16. The device as claimed in claim 15, further comprising a rule database for recording the models corresponding to each sequence, wherein the rule database further comprises:

value of N and M; and
value of the predetermined tolerable threshold.

* * * * *